(12) United States Patent
Qin et al.

(10) Patent No.: US 10,438,163 B2
(45) Date of Patent: Oct. 8, 2019

(54) SYSTEM AND METHOD FOR AFFINITY-BASED OPTIMAL ASSORTMENT SELECTION FOR INVENTORY DEPLOYMENT

(71) Applicant: Wal-Mart Stores, Inc., Bentonville, AR (US)

(72) Inventors: Zhiwei Qin, San Mateo, CA (US); Arash Asadi, San Bruno, CA (US); Jagtej Bewli, San Mateo, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 683 days.

(21) Appl. No.: 14/790,591

(22) Filed: Jul. 2, 2015

(65) Prior Publication Data

US 2017/0004441 A1    Jan. 5, 2017

(51) Int. Cl.
- *G06Q 10/00* (2012.01)
- *G06Q 10/08* (2012.01)
- *G06Q 10/06* (2012.01)

(52) U.S. Cl.
CPC ..... *G06Q 10/087* (2013.01); *G06Q 10/06315* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 5,524,077 A | 6/1996 | Faaland et al. | |
| 7,593,871 B1 * | 9/2009 | Mesaros | G06Q 30/02 705/26.2 |
| 7,664,683 B2 | 2/2010 | Feldman et al. | |
| 7,797,205 B2 | 9/2010 | Song et al. | |
| 7,881,820 B2 | 2/2011 | Antony et al. | |
| 8,239,237 B2 | 8/2012 | An et al. | |
| 8,352,382 B1 * | 1/2013 | Katta | G06Q 50/28 705/330 |
| 8,374,922 B1 * | 2/2013 | Antony | G06Q 30/00 705/26.1 |
| 8,438,052 B1 * | 5/2013 | Chanda | G06Q 30/0282 705/7.11 |
| 8,527,373 B1 * | 9/2013 | Ricci | G06Q 10/087 705/22 |

(Continued)

OTHER PUBLICATIONS

Depth First Watch (Archived from Wayback Machine, Jan. 10, 2012—http://web.archive.org/web/20120110154306/http://en.widipedia.org/wiki/Depth-first_search) 5 pgs. Jan. 10, 2012.

(Continued)

*Primary Examiner* — Alan S Miller
*Assistant Examiner* — Mustafa Iqbal
(74) *Attorney, Agent, or Firm* — Bryan Cave Leighton Paisner LLP

(57) ABSTRACT

A system and method for selecting an deployment of goods for shipping purposes is presented. An affinity network representing the deployment of goods is created. A first and second set of goods in the affinity network are created, the first set of goods representing an initial set of goods to be placed in a first location and the second set of goods representing a set of goods that are constrained to be placed in a second location. An objective function is iteratively operated to determine an optimum deployment of goods between the first location and second location. Other embodiments are disclosed.

24 Claims, 9 Drawing Sheets

(56) References Cited

U.S. PATENT DOCUMENTS

| | | | |
|---|---|---|---|
| 8,560,461 B1 * | 10/2013 | Tian | G06Q 10/087 705/332 |
| 8,620,707 B1 * | 12/2013 | Belyi | G06Q 10/087 705/28 |
| 2005/0267791 A1 | 12/2005 | LaVoie et al. | |
| 2007/0185786 A1 | 8/2007 | Ettl et al. | |
| 2007/0239297 A1 | 10/2007 | Degbotse et al. | |
| 2008/0086392 A1 | 4/2008 | Bishop et al. | |
| 2011/0145030 A1 | 6/2011 | Allen | |
| 2011/0225023 A1 | 9/2011 | Evens et al. | |
| 2011/0295413 A1 | 12/2011 | Hara et al. | |
| 2012/0284083 A1 * | 11/2012 | Wu | G06Q 10/08 705/7.31 |
| 2013/0018696 A1 | 1/2013 | Meldrum | |
| 2013/0037613 A1 | 2/2013 | Soldate | |
| 2013/0046574 A1 | 2/2013 | Griep et al. | |
| 2014/0184818 A1 | 7/2014 | Argue et al. | |
| 2014/0222601 A1 | 8/2014 | Soldate | |
| 2014/0278627 A1 | 9/2014 | Grabovski et al. | |
| 2015/0032512 A1 | 1/2015 | Bateni | |
| 2015/0106224 A1 | 4/2015 | Stevens et al. | |

OTHER PUBLICATIONS

Dworak, David, D., Victory's Foundation: US logistical support of the Allied Mediterranean Campaign, 1942-1945, Syracuse University, ProQuest Dissertations Publishing, 2011 (3 pgs) 2011.

* cited by examiner

| Transaction ID 702 | Item ID 704 |
|---|---|
| 1 | 2001 |
| 1 | 2002 |
| 2 | 2001 |
| 2 | 2002 |
| 2 | 2003 |
| 3 | 2002 |
| 3 | 2003 |

FIG. 7

| First Item ID 802 | Second Item ID 804 | Frequency 806 |
|---|---|---|
| 2001 | 2002 | 1 |
| 2002 | 2003 | 1 |

FIG. 8

SYSTEM AND METHOD FOR AFFINITY-BASED OPTIMAL ASSORTMENT SELECTION FOR INVENTORY DEPLOYMENT

TECHNICAL FIELD

This disclosure relates generally to electronic commerce, and relates more particularly to product deployment for optimum fulfillment of orders from multiple locations.

BACKGROUND

There is an increasing number of consumers who are purchasing items online using electronic commerce providers. Larger electronic commerce providers often have more than one location from which to fulfill orders. Fulfilling the orders in a cost-effective manner can result in a cost savings to the electronic commerce provider and quicker shipments, resulting in more satisfied customers. It would be desirable to find an optimum deployment of goods within the various locations to result in the most efficient shipping.

BRIEF DESCRIPTION OF THE DRAWINGS

To facilitate further description of the embodiments, the following drawings are provided in which:

FIG. 7 is a table listing an exemplary input set of an affinity network according to an embodiment;

FIG. 8 is a table illustrating an exemplary association table according to an embodiment;

Figure 1:
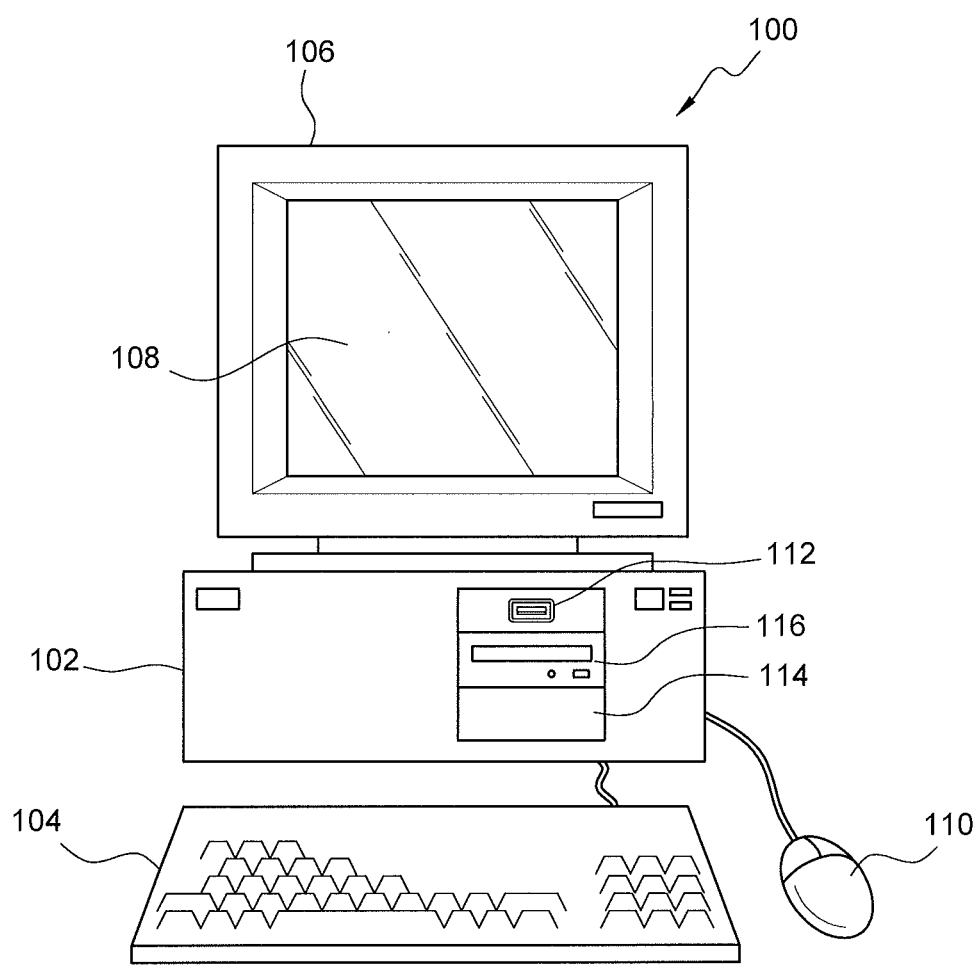
FIG. 1 illustrates a front elevation view of a computer system that is suitable for implementing at least part of a central computer system, according to an embodiment.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements can be electrically coupled together, but not be mechanically or otherwise coupled together. Coupling can be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Some embodiments include a system. The system can comprise: a display; one or more input devices; one or more processing modules; and one or more non-transitory storage modules storing computing instructions configured to run on the one or more processing modules and perform the acts of: creating an affinity network to represent items being sold by an eCommerce provider; creating a first set of items from the affinity network to represent the items being initially stored at a first location; creating a second set of items from the affinity network to represent the items that cannot be moved to the first location; determining one or more of the items to be deployed at the first location by using an objective function; and causing the one or more of the items to be stored at the first location.

Some embodiments include a method. The method can comprise: creating an affinity network to represent items being sold by an eCommerce provider; creating a first set of items from the affinity network to represent the items being initially stored at a first location; creating a second set of items from the affinity network to represent the items that cannot be moved to the first location; determining one or more of the items to be deployed at the first location by using an objective function; and causing the one or more of the items to be stored at the first location.

Figure 2:
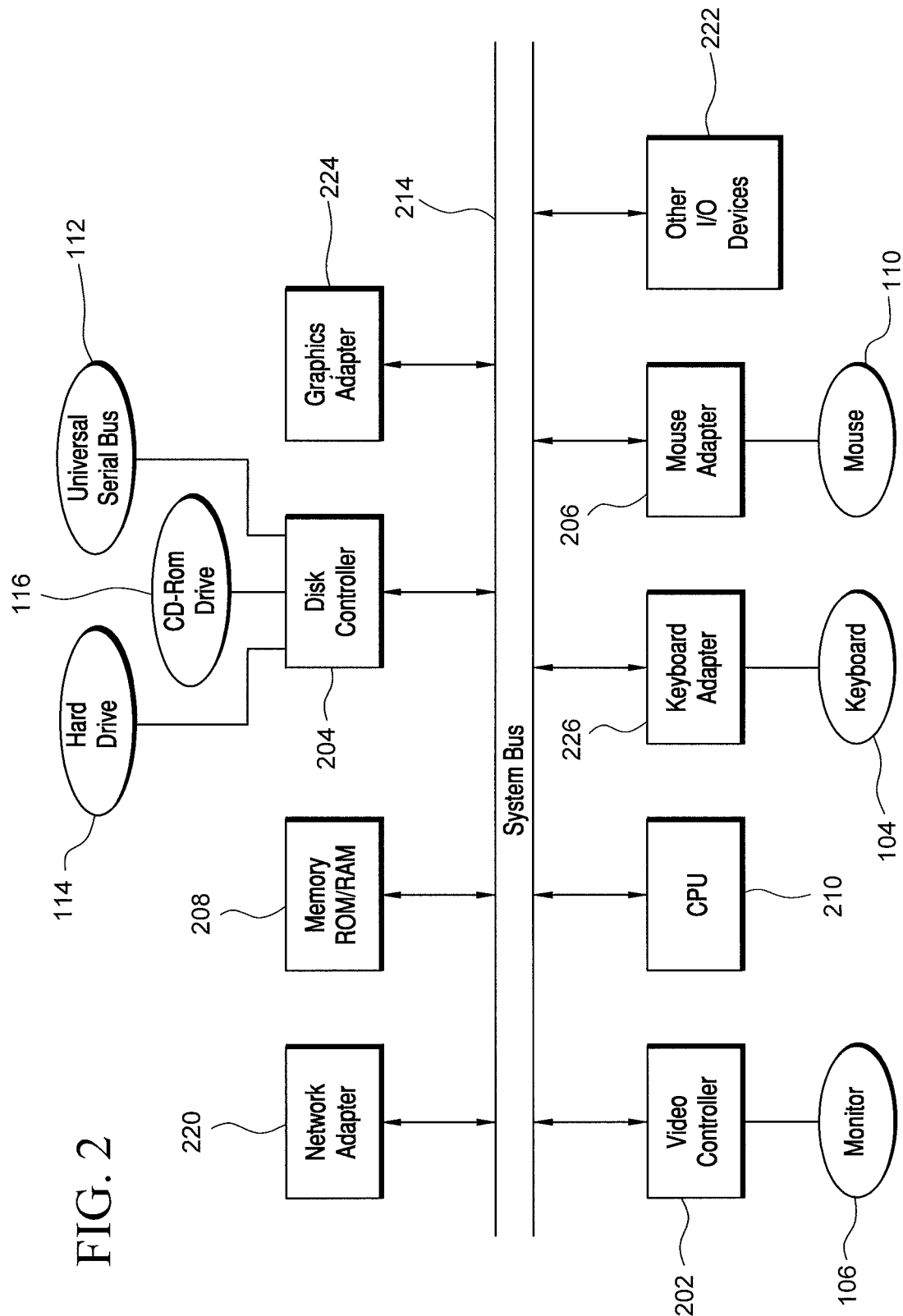
FIG. 2 illustrates a representative block diagram of exemplary elements included on the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a drive 114. Drive 114 can be a hard drive that uses spinning magnetic disks to store data or it can be a solid state drive (SSD) that uses a fast, non-volatile memory for storage. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) volatile (e.g., transitory) memory, such as, for example, read only memory (ROM) and/or (ii) non-volatile (e.g., non-transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), drive 114 (FIGS. 1-2), CD-ROM and/or DVD drive 116 (FIGS. 1-2), a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
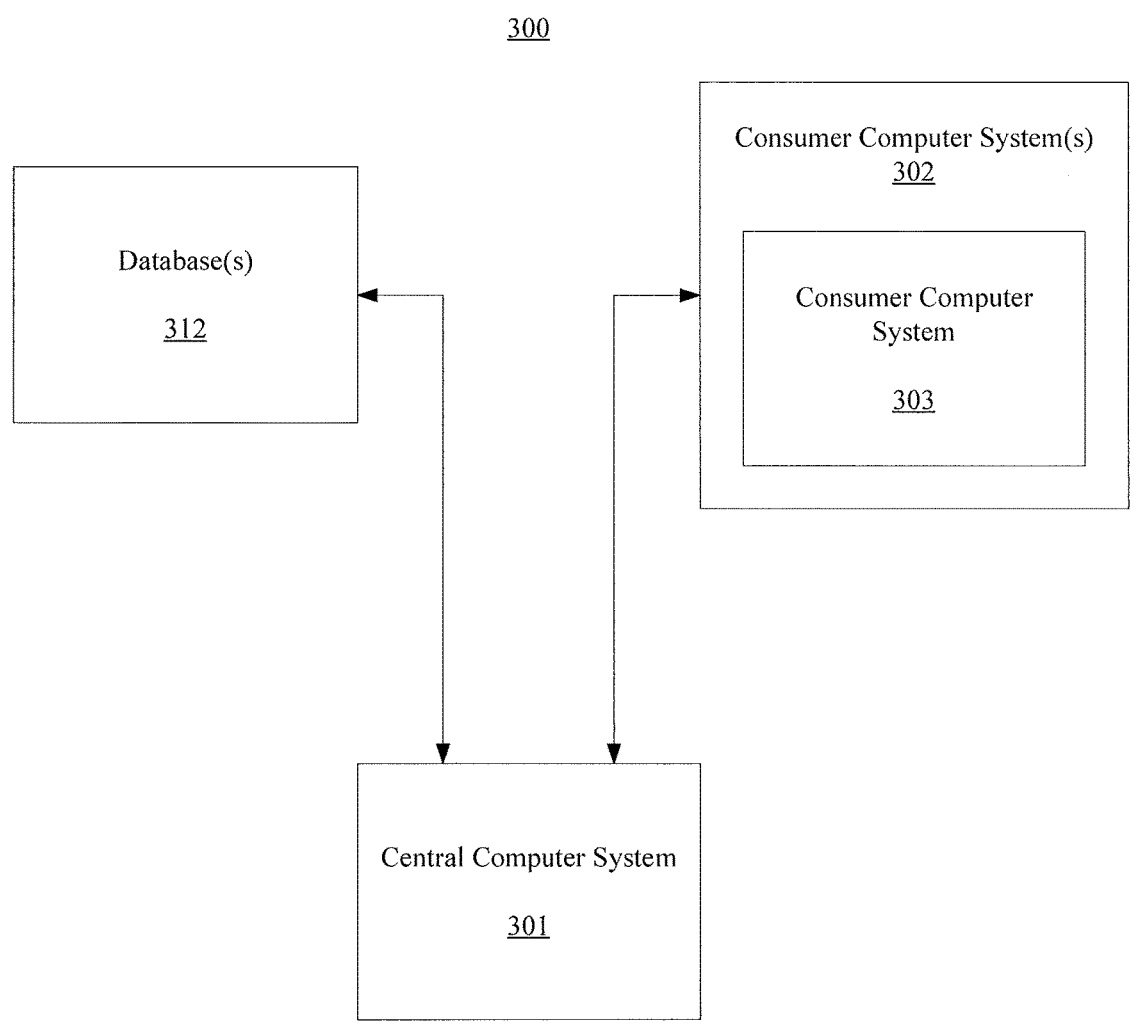
FIG. 3 illustrates a representative block diagram of a system, according to an embodiment.

Skipping ahead now in the drawings, FIG. 3 illustrates a representative block diagram of a system 300, according to an embodiment. System 300 is merely exemplary and embodiments of the system are not limited to the embodiments presented herein. System 300 can be employed in many different embodiments or examples not specifically depicted or described herein. In some embodiments, certain elements or modules of system 300 can perform various methods and/or activities of those methods. In these or other embodiments, the methods and/or the activities of the methods can be performed by other suitable elements or modules of system 300.

As further described in greater detail below, in these or other embodiments, system 300 can proactively (e.g., prospectively) and/or reactively (e.g., responsively) determine and/or communicate the consumer product information to the consumer, as desired. Proactive acts can refer to acts (e.g., identification, determination, communication, etc.) performed without consideration of one or more predetermined acts performed by the consumer; and reactive acts can refer to acts (e.g., identification, determination, communication, etc.) performed with consideration of (i.e., in response to) one or more predetermined acts performed by the consumer. For example, in some embodiments, the predetermined act(s) can comprise an act of identifying a selection of a consumer product by the consumer.

Meanwhile, as also described in greater detail below, system 300 can be implemented in brick-and-mortar commerce and/or electronic commerce applications, as desirable. Further, in many of these or other embodiments, system 300 can communicate the consumer product information to the consumer substantially in real-time (e.g., near real-time). Near real-time can mean real-time less a time delay for processing (e.g., determining) and/or transmitting the relevant consumer product information to the relevant consumer. The particular time delay can vary depending on the type and/or amount of the consumer product information, the processing speed(s) of the processing module(s) of system 300, the transmission capability of the communication hardware (as introduced below), the transmission distance, etc. However, in many embodiments, the time delay can be less than approximately one, five, ten, or twenty minutes.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Specifically, system 300 comprises a central computer system 301. In many embodiments, central computer system 301 can be similar or identical to computer system 100 (FIG. 1). Accordingly, central computer system 301 can comprise one or more processing modules and one or more memory storage modules (e.g., one or more non-transitory memory storage modules). In these or other embodiments, the processing module(s) and/or the memory storage module(s) can be similar or identical to the processing module(s) and/or memory storage module(s) (e.g., non-transitory memory storage modules) described above with respect to computer system 100 (FIG. 1). In some embodiments, central computer system 301 can comprise a single computer or server, but in many embodiments, central computer system 301 comprises a cluster or collection of computers or servers and/or a cloud of computers or servers. Meanwhile, central computer system 301 can comprise one or more input devices (e.g., one or more keyboards, one or more keypads, one or more pointing devices such as a computer mouse or computer mice, one or more touchscreen displays, etc.), and/or can comprise one or more display devices (e.g., one or more monitors, one or more touchscreen displays, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of central computer system 301 in a wired manner and/or a wireless manner, and the coupling can be direct and/or indirect, as well as locally and/or remotely. As an example of an indirect manner (which may or may not be a remote manner, as well), a keyboard-video-mouse (KVM) switch can be used to couple the input device(s) and the display device(s) to the processing module(s) and/or the memory storage module(s). In some embodiments, the KVM switch also can be part of central computer system 301. In a similar manner, the processing module(s) and the memory storage module(s) can be local and/or remote to each other.

In many embodiments, central computer system 301 is configured to communicate with one or more consumer computer systems 302 (e.g., a consumer computer system 303) of one or more consumers. For example, the consumer(s) can interface (e.g., interact) with central computer system 301, and vice versa, via consumer computer system(s) 302 (e.g., consumer computer system 303). Accordingly, in many embodiments, central computer system 301 can refer to a back end of system 300 operated by an operator and/or administrator of system 300, and consumer computer system(s) 302 can refer to a front end of system 300 used by one or more users of system 300 (i.e., the consumer(s)). In these or other embodiments, the operator and/or administrator of system 300 can manage central computer system 301, the processing module(s) of computer system 301, and/or the memory storage module(s) of computer system 301 using the input device(s) and/or display device(s) of central computer system 301. In some embodiments, system 300 can comprise consumer computer system(s) 302 (e.g., consumer computer system 303).

Like central computer system 301, each of consumer computer system(s) 302 can be similar or identical to computer system 100 (FIG. 1), and in many embodiments, each of consumer computer system(s) 302 can be similar or identical to each other. In many embodiments, consumer computer system(s) 302 can comprise one or more desktop computer devices, one or more wearable user computer devices, and/or one or more mobile devices, etc. At least part of central computer system 301 can be located remotely from consumer computer system(s) 302.

In some embodiments, a mobile device can refer to a portable electronic device (e.g., an electronic device easily conveyable by hand by a person of average size) with the capability to present audio and/or visual data (e.g., images, videos, music, etc.). For example, a mobile device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can comprise a volume and/or weight sufficiently small as to permit the mobile device to be easily conveyable by hand. For examples, in some embodiments, a mobile device can occupy a volume of less than or equal to approximately 189 cubic centimeters, 244 cubic centimeters, 1790 cubic centimeters, 2434 cubic centimeters, 2876 cubic centimeters, 4056 cubic centimeters, and/or 5752 cubic centimeters. Further, in these embodiments, a mobile device can weigh less than or equal to 3.24 Newtons, 4.35 Newtons, 15.6 Newtons, 17.8 Newtons, 22.3 Newtons, 31.2 Newtons, and/or 44.5 Newtons.

Exemplary mobile devices can comprise, but are not limited to, one of the following: (i) an iPod®, iPhone®, iPod Touch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia®, Surface Pro™, or similar product by the Microsoft Corporation of Redmond, Wash., United States of America, and/or (iv) a Galaxy™, Galaxy Tab™, Note™, or similar product by the Samsung Group of Samsung Town, Seoul, South Korea. Further, in the same or different embodiments, a mobile device can comprise an electronic device configured to implement one or more of (i) the iOS™ operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by Google, Inc. of Mountain View, Calif., United States, (v) the Windows Mobile™, Windows Phone™, and Windows 10 (mobile)™ operating systems by Microsoft Corporation of Redmond, Wash., United States of America, or (vi) the Symbian™ operating system by Nokia Corp. of Keilaniemi, Espoo, Finland.

In further embodiments, central computer system 301 can be configured to communicate with software (e.g., one or more web browsers, one or more mobile software applications, etc.) of the consumer computer system(s) 302 (e.g., consumer computer system 303). For example, the software can run on one or more processing modules and can be stored on one or more memory storage modules (e.g., one or more non-transitory memory storage modules) of the consumer computer system(s) 302 (e.g., consumer computer system 303). In these or other embodiments, the processing module(s) of the consumer computer system(s) 302 (e.g., consumer computer system 303) can be similar or identical to the processing module(s) described above with respect to computer system 100 (FIG. 1). Further, the memory storage module(s) (e.g., non-transitory memory storage modules) of the consumer computer system(s) 302 (e.g., consumer computer system 303) can be similar or identical to the memory storage module(s) (e.g., non-transitory memory storage module(s)) described above with respect to computer system 100 (FIG. 1). Exemplary web browsers can include (i) Firefox® by the Mozilla Organization of Mountain View, Calif., United States of America, (ii) Internet Explorer® by the Microsoft Corp. of Redmond, Wash., United States of America, (iii) Chrome™ by Google Inc. of Menlo Park, Calif., United States of America, (iv) Opera® by Opera Software of Oslo, Norway, and (v) Safari® by Apple Inc. of Cupertino, Calif., United States of America.

Meanwhile, in many embodiments, central computer system 301 also can be configured to communicate with one or more databases 312. The database can comprise a product database that contains information about products sold by a retailer. Database(s) 312 can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of database(s) 312, that particular database can be stored on a single memory storage module of the memory storage module(s) and/or the non-transitory memory storage module(s) storing database(s) 312 or it can be spread across multiple of the memory storage module(s) and/or non-transitory memory storage module(s) storing database(s) 312, depending on the size of the particular database and/or the storage capacity of the memory storage module(s) and/or non-transitory memory storage module(s).

In these or other embodiments, the memory storage module(s) of central computer system 300 can comprise some or all of the memory storage module(s) storing database(s) 312. In further embodiments, some of the memory storage module(s) storing database(s) 312 can be part of consumer computer systems 302 and/or one or more third-party computer systems (i.e., other than central computer system 301 and consumer computer systems 302), and in still further embodiments, all of the memory storage module(s) storing database(s) 312 can be part of consumer computer systems 302 and/or the third-party computer system(s). Like central computer system 301 and consumer computer system(s) 302, when applicable, each of the third-party computer system(s) can be similar or identical to computer system 100 (FIG. 1). Notably, the third-party computer systems are omitted from the drawings to better illustrate that database(s) 312 can be stored at memory storage module(s) of central computer system 301, consumer computer system(s) 302, and/or the third-party computer systems, depending on the manner in which system 300 is implemented.

Database(s) 312 each can comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between central computer system 301, consumer computer system(s) 302 (e.g., consumer computer system 303), and/or database(s) 312 can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc. Exemplary LAN and/or WAN protocol(s) can comprise Data Over Cable Service Interface Specification (DOCSIS), Institute of Electrical and Electronic Engineers (IEEE) 802.3 (also known as Ethernet), IEEE 802.11 (also known as WiFi), etc. Exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, and the like. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.)

For convenience, the functionality of system 300 is described herein as it relates particularly to consumer computer system 303 and a single consumer, but in many embodiments, the functionality of system 300 can be extended to each of consumer computer system(s) 302 and/or to multiple consumers. In these extended examples, in some embodiments, single consumers can interface (e.g., interact) with central computer system 301 using multiple consumer computer systems of consumer computer system(s) 302 (e.g., at different times). For example, a consumer could interface with central computer system 301 via a first consumer computer system (e.g., a desktop computer), such as, for example, when interfacing with central computer system 301 from home, and via a second consumer computer system (e.g., a mobile device), such as, for example, when interfacing with central computer system 301 away from home.

Electronic commerce ("eCommerce") allows customers to purchase items without incurring the hassle of traveling to a retail store or shopping center. After receiving an order, the eCommerce provider takes the item from a warehouse or distribution center and sends the items directly to the customer via a delivery service. As sales via eCommerce has grown in volume, larger eCommerce providers have found that having a single distribution center can be inefficient and have begun to use multiple distribution centers, located throughout the country or other place of interest.

There can be various different layouts of distribution centers. Some eCommerce providers might prefer to have several large distribution centers or warehouses located throughout the country. Other eCommerce providers might have one or more small distribution centers or warehouses along with one or more large distribution centers or warehouses. The use of smaller distribution centers might be termed forward deployment. Other eCommerce providers may utilize one or more drop ship vendors (DSV) to supply some of the ordered goods. A DSV is a distributor or manufacturer that ships items directly to a customer, without the need for the eCommerce provider to store items in its own shipping facility. Other eCommerce providers may use a combination of the above-listed methods.

When an eCommerce provider has many options from which to ship an item from, finding the most efficient option can result in a great cost savings to the eCommerce provider, the fastest shipping to the customer, and a better shopping experience for the customer.

Figure 4:
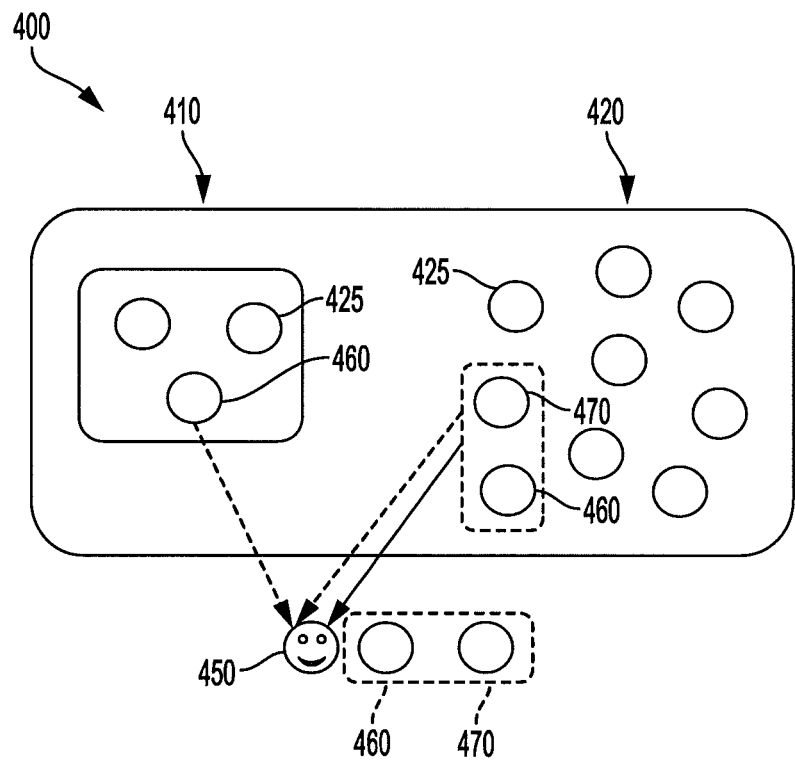
FIG. 4 is a block diagram illustrating a fulfillment network according to an embodiment.

FIG. 4 presents an example of an issue being faced by an eCommerce provider. Fulfillment network 400 comprises a first warehouse 410 and a second warehouse 420. Each of blocks 425 represents an item being stored, either in first warehouse 410 or second warehouse 420. A customer 450 orders two items from the eCommerce provider, item 460 and item 470. First warehouse 410 has only item 460 in stock. Second warehouse 420 has both item 460 and item 470 in stock.

In some embodiments, first warehouse 410 might represent a smaller, local warehouse, and second warehouse 420 might represents a larger warehouse. The layout of some eCommerce providers relies on both larger warehouses and smaller warehouses. In those situations, an eCommerce provider might have more warehouses that are smaller in size. These smaller warehouses will be located in proximity to many population centers throughout the country. The larger warehouses have a larger inventory, but might be further in distance from most customers. In some embodiments, first warehouse 410 might represent a warehouse owned by the eCommerce retailer while second warehouse 420 might represent a DSV. Other combinations also are possible.

In the situation being illustrated in FIG. 4, the order of customer 450 can be fulfilled in one of two different ways. In one method, item 460 is fulfilled by first warehouse 410, and item 470 is fulfilled by second warehouse 420. This is what can be termed a "split order." This order will require two boxes and two different shipments to customer 450. However, because first warehouse 410 is closer to customer 450, the customer might receive the shipment for order 460 sooner.

Another method of shipping would have both item 460 and item 470 being fulfilled by second warehouse 420. A downside to this shipping method is that the time for the shipment to arrive might be longer (because the distance from second warehouse 420 to customer 450 might be longer than the distance from first warehouse 410 to customer 450.) The benefit to this shipping method is the need to ship from only one location, possibly lowering shipping costs.

Figure 5:
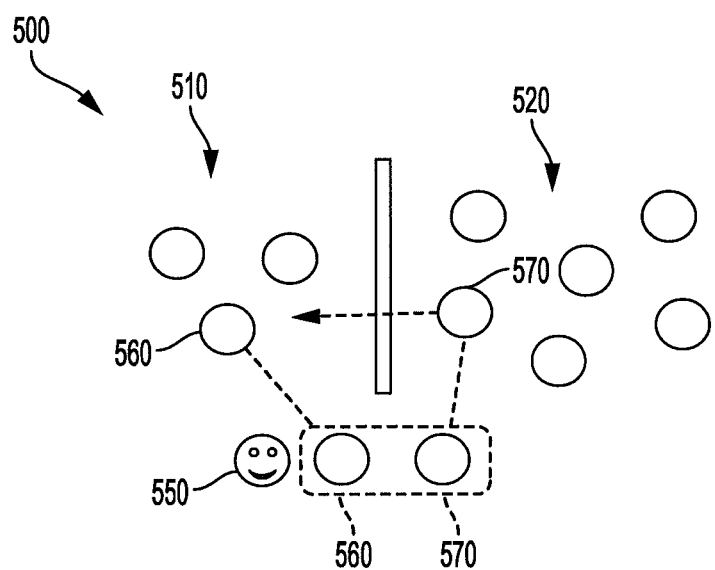
FIG. 5 is a block diagram illustrating another fulfillment network according to an embodiment.

FIG. 5 presents a second potential situation. There is a first warehouse 510 and a second warehouse 520. It should be understood that second warehouse 520 can be a DSV or it can be a larger warehouse than first warehouse 510. There is a customer 550 who ordered two items 560 and 570. Item 560 is in stock at smaller warehouse 510. Item 570 is available only from second warehouse 520.

FIG. 5 shows an alternative method of handling the situation of a customer ordering an item that would result in a split order. The split order present in FIG. 5 arises from the fact that one method of fulfilling the order is to have one shipment of item 560 from first warehouse 510 and one shipment of item 570 from second warehouse 520. An alternative method of fulfilling the shipment is to ship item 570 from second warehouse 520 to first warehouse 510. After first warehouse 510 receives the item, first warehouse 510, which is closer to customer 550, sends a single shipment containing both item 560 and item 570 to customer 550.

There are advantages and disadvantages to both split shipments and to shipments directly from second warehouse 520 to first warehouse 510. A split shipment requires two packages and uses two different shipments to a customer. A shipment from second warehouse 520 to first warehouse 510 (or from second warehouse 420 to first warehouse 410), might take longer because of the requirement of two separate shipments. However, the shipment from second warehouse 520 to smaller warehouse 510 can be done in bulk—instead of a single shipment of a single item from second warehouse 520 to warehouse 510, there can be a single shipment of many different items from multiple orders from second warehouse 520 to warehouse 510.

While determining the breakdown of shipping costs for a single customer who is ordering two items might seem relatively simple, a large eCommerce provider has thousands of customers each day. Each customer may be ordering multiple items. Each item might be available in more than one warehouse. Determining an optimum deployment of goods to allow for optimum fulfillment of orders for every order placed in a single day can be a very complex and calculation intensive project.

An embodiment analyzes sales and/or sales forecasts of the retailer to determine the popularity of items and items that are commonly sold together. Thereafter, the popularity of items and relationships between items can be analyzed and the optimum deployment of items for each warehouse can be determined. The popularity can be analyzed specific to geography. In such a manner, items that are popular in warehouses that serve warm-weather climate customers might be different from items that are popular in warehouses that server cold-weather climate customers. Various constraints can be placed on the deployment of the items.

Figure 6:
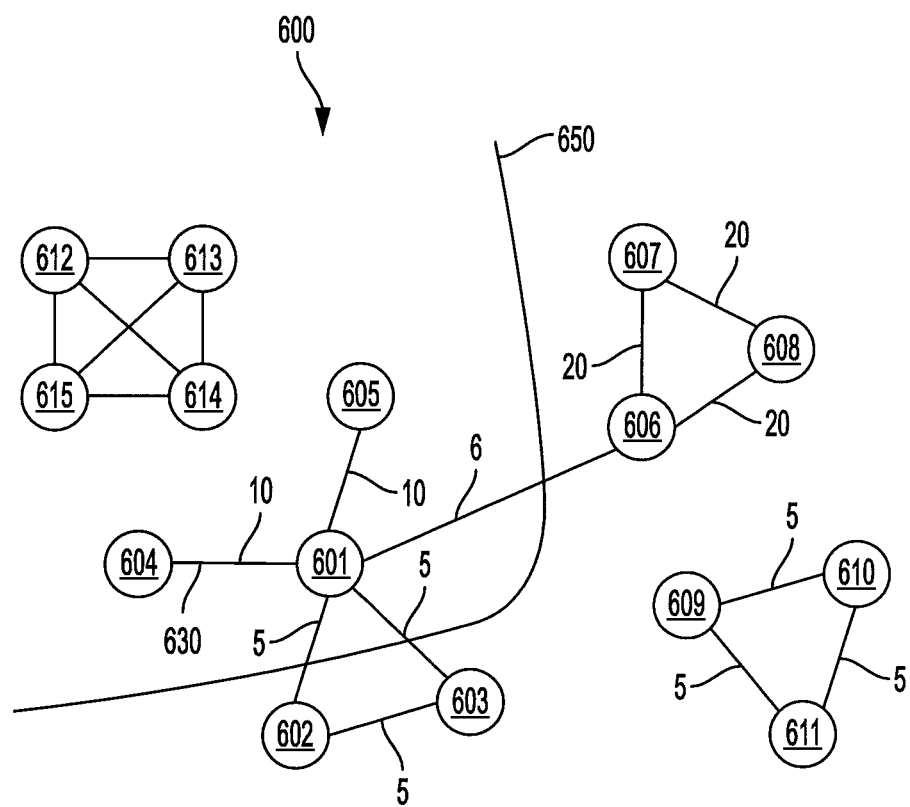
FIG. 6 is a block diagram representing an affinity network according to an embodiment.

FIG. 6 presents a diagram representing an affinity network 600 to illustrate the operation of an embodiment. For purposes of various embodiments, an affinity network (also known as a small-world network) is a type of mathematical graph in which the nodes of the network represent items for sale by an eCommerce provider. An edge links nodes of the network to each other and can represent a relationship between two nodes. In some embodiments, the presence of an edge indicates an order that contain an item represented by each node. An embodiment can be a minimum-cut problem on the affinity network.

Affinity network 600 contains fifteen nodes (601 through 615). Each node represents a product for sale by the eCommerce provider. It should be understood that affinity network 600 is merely an exemplary subset of an actual affinity network, presented for purposes of illustration. An eCommerce provider might have tens of thousands of items that would each be a node in an affinity network. However, only 15 items are shown in affinity network 600 for ease of description.

Each of the nodes might have one or more edges between the node and at least one other node. For purposes of affinity network 600, each edge between two nodes represents a sale to one customer of both items being connected by the edge. For example, node 604 and node 601 are connected by an edge 630 because they were purchased together a number of times. In FIG. 6, the number of times the items were purchased together can be written adjacent to the edge.

There also may be a selection boundary 650. Selection boundary 650 is the line that separates one warehouse location from another. The ultimate purpose of affinity network 600 is to place selection boundary 650 in the most optimum location. Moving selection boundary 650 to include a node is a graphical representation of changing the deployment of that item from one warehouse location to another warehouse location (or DSV) or simply making that item available in the other warehouse.

An exemplary affinity network can have an input set containing two columns: one for transaction ID and one for item ID. Each transaction ID represents a sale. Associated with each transaction ID is one or more item IDs, which represent the item purchased in a transaction. Thus, an input set can contain multiple rows with the same transaction ID. An exemplary input set is presented in FIG. 7, with column 702 representing the transaction ID and column 704 representing the ID. Thus, transaction ID 1 involved the purchase of two items: item ID 2001 and item ID 2002.

The relationship between two item IDs can be represented in an association table. An association table tabulates how often two item IDs are purchased together in a single transaction. An exemplary association table is presented in FIG. 8, with column 802 representing the first Item ID, column 804 representing the second item ID, and column 806 representing the number of times the first item ID and the second item ID were part of a single purchase.

FIG. 8 shows that item 2001 and item 2002 were in the same transaction one time, while item 2002 and item 2003 were in the same transaction one time. The association table shown in FIG. 8 can be generated from the data in FIG. 7 in one of a variety of different methods known in the art. Exemplary methods can include data mining algorithms such as the Apriori algorithm. The association table shown in FIG. 8 is a method of tabulating each of the edges of an affinity network.

It should be understood that FIGS. 7 and 8 are merely shown for exemplary purposes. A full input set of a large eCommerce provider can have hundreds of thousands of entries (or more).

The affinity network can be notated as G. The process illustrated in FIG. 6 is dividing G into two sets of nodes which are to be stocked in different facilities—a first warehouse and a second warehouse. The goal is finding a split location that minimizes the total cost of the edges crossing the two sets of nodes.

There can be two other sets of nodes with respect to affinity network G—set B and set D. Set B is the base item set—items that are ideally located in the smaller warehouse for one of a variety of different reasons. Set D contains items that are stored at the larger warehouse for a variety of reasons. In other words, the items that cannot be stored in the smaller warehouses, in an eCommerce embodiment. There might be limitations due to the smaller size of the smaller warehouses being unable to store some of the larger, bulkier items, such as certain types of furniture. Limitations might also be due to being unable to store certain food items for climate reasons, for example.

In some embodiments, set B can have the 500 highest selling items sold by an eCommerce provider. In other embodiments, a number other than 500 can be chosen. The mathematical problem to be solved is to determine which items should be placed in a smaller warehouse and which should be placed in a larger warehouse, given the constraints given of set B and set D.

Let $c_{ij}$ be the cost of an edge (i, j) within affinity network G. The variables i and j represent items being sold by the eCommerce provider. Thus, $c_{ij}$ represents the frequency that i and j are ordered together.

Let $y_{ij}$ be a binary variable that indicates whether or not edge (i, j) is within B. Let $x_k$ be a binary variable that is equal to 1 when node k is within set B and 0 if node k is within set D. Let $s_k$ be the number of stock keeping units (SKUs) represented by node k. Let K be the maximum number of nodes that can be added to the first warehouse.

The objective function to be minimized can be expressed as follows:

$$\min_{x,y} \Sigma_{i,j} c_{ij} y_{ij}$$

Such that, $y_{ij} \geq |x_i - x_j|$ $$\Sigma_k x_k \leq K$$

$$x_k = 1, \forall k \in B$$

$$x_k = 0, \forall k \in D$$

$$y_{ij} \geq 0, x_k \in \{0,1\}$$

It can be seen that $y_{ij}$ is also a binary integer, because $x_i$ and $x_j$ can only be 0 or 1. Furthermore, $y_{ij}$ is only 1 if $x_i$ is not equal to $x_j$, meaning that they are in separate warehouses.

Returning to FIG. 6, given the initial set of nodes and edges, the most cost effective solution would be to add nodes 602 and 603 to the smaller warehouse, resulting in a re-drawing of selection boundary 650 to include nodes 602 and 603.

In an eCommerce embodiment, set B defines the set of items that are initially placed in the smaller warehouse facility. Typically, these would be top-selling items. In some embodiments, set B initially comprises the top K items in terms of demand per time period. Because the sales are limited per time period, it should be understood that the composition of set B can change for various reasons, such as the shopping season—e.g. more "back-to-school" items in mid-to-late summer and more toys and electronics in the late fall. It should also be understood that sales per time period can be replaced with forecast sales per time period in some embodiments. Other items that might be in set B can be items with a high probability of inducing purchases of other items. In other words, items that are often purchased with other items that are in set B. For example, if a certain iPad is within the top K items, but a certain iPad case is often purchased with the iPad, that iPad case can be placed in set B despite the fact that the iPad case is not one of the top K items.

There also can be "bundles" (also known as "cliques"). A bundle is a set of multiple items that are typically sold in the same transaction. The items might be tracked separately for each piece of the bundle, but are typically sold together. An exemplary bundle might be a television and stand. A particular television set might only be sold with a particular television stand. And vice versa, with the stand being sold only with a particular television. This type of bundle might be considered a "hard bundle" because the items are typically sold together. This can be to distinguish the bundle from a "soft bundle" which might include items that are sold together for a specific promotion, but the items are still available separately (e.g., a video game console bundled with a certain video game for a limited time period, but one or both of the console and the video game might still be available for purchase separately).

Figure 9:
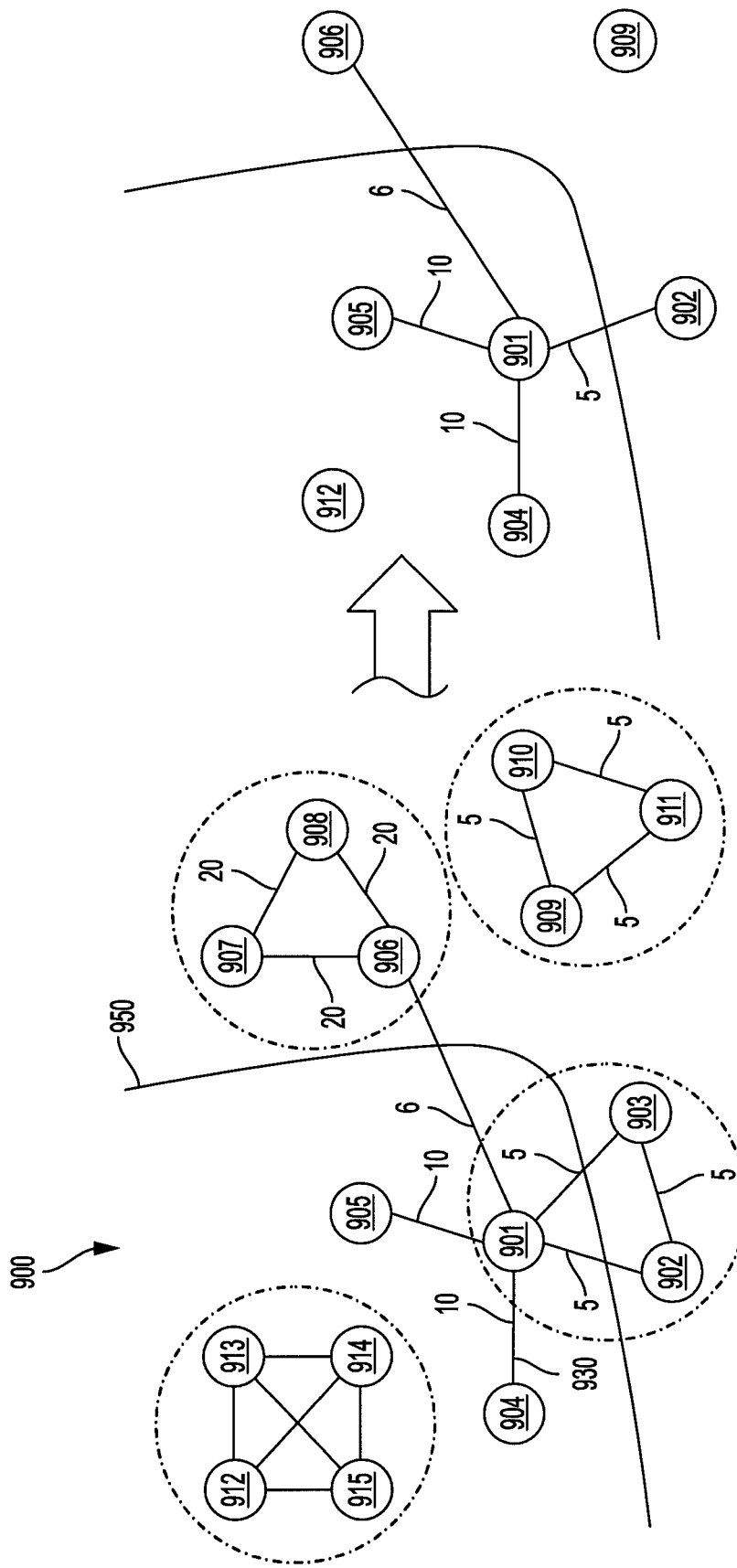
FIG. 9A is a block diagram of an affinity network featuring hard bundles according to an embodiment.
FIG. 9B is a block diagram of an affinity network after hard bundles have been determined according to an embodiment.

FIG. 9A presents a diagram representing an affinity network 900 to illustrate the operation of an embodiment.

Affinity network 900 is similar to affinity network 600 shown in FIG. 6. One difference between FIG. 6 and FIG. 9A is that hard bundles of nodes are shown in FIG. 9A.

The four bundles of FIG. 9A are as follows: {901, 902, 903}; {906, 907, 908}; {909, 910, 911}; and {912, 913, 914, 915}. Because of the presence of hard bundles, the actual number of splits is lower than presented in FIG. 6. For example, nodes 901, 902, and 903 are a hard bundle and are always ordered together. In FIG. 6, nodes 601, 602, and 603 contribute 10 edges. However, that number is inflated in FIG. 9A because nodes 901, 902, and 903 are always ordered together. Only 5 splits occur in reality because nodes 902 and 903 are shipped together in 5 packages and node 901 is shipped in another 5 packages.

FIG. 9B represents affinity network 900 after the bundles are taken into consideration. The result is that several groups of nodes are replaced, represented by single nodes. The only nodes remaining in FIG. 9B are nodes 901, 902, 904, 905, 906, 909, and 912.

Mathematically speaking, accounting for bundles can take place in the following manner. By consolidating the nodes, they appear as a single node with a SKU count greater than one. Those bundles that cross the selection boundary are consolidated into two nodes, one on each side. To account for a node with SKU count greater than 1, the objective function is modified as follows:

$$\min_{x,y} \Sigma_{i,j} c_{ij} y_{ij} - \delta \Sigma_{k: s_k > 1} d_k x_k$$

Such that, $y_{ij} \geq |x_i - x_j|$ $$\Sigma_k x_k \leq K$$

$$x_k = 1, \forall k \in B$$

$x_k=0, \forall k \in D$ $y_{ij} \geq 0, x_k \in \{0,1\}$

For all non-bundle nodes, $d_k=1$, whereas for bundle nodes, $d_k$ is equal to the number of occurrences of the bundle. δ is an arbitrary small constant which can be set to $$\frac{1}{K}.$$

The second term in the objective function is to make sure that isolated bundles are selected as long as SKU capacity allows, with higher-demand bundles are favored over lower-demand bundles.

While the above-listed algorithms attempt to minimize costs based solely on taking into account split shipments, modifications can be made to the algorithms to take into account other costs, such as costs due to longer shipping distances as a result of not selecting an item, in addition to splits.

As described above, the difference between a first warehouse and a second warehouse might be that the smaller first warehouse is closer to various population centers than the larger second warehouse. Returning to FIG. 6, there are three different types of edges present. 1) There are edges where the nodes being joined are both in the smaller warehouse (i.e., set B)—there is no split and transportation costs are at a minimum. This is exemplified by the edges between node 612 and 613, for example. 2) There are edges where the nodes being joined are both in the larger warehouse (set D). Both nodes are shipped from the farther facility, resulting in additional transportation costs, but there are no split shipments possible. This is exemplified in the edge between nodes 610 and 611. 3) There are edges where the nodes being joined are in different sets—there is an additional cost either due to the presence of a split (should the items be shipped from different sets) or additional costs due to longer shipping distances (should the items be shipped from the farther warehouse). This is exemplified in the edge between nodes 601 and 606.

To distinguish the latter two cases, there can be a new binary variable $z_{ij}$. This variable is equal to zero if both items are in the second warehouse and equal to one otherwise. There can be a new cost variable $c_{ij}$ that represents the cost difference for shipping items i and j due to longer shipping distances. There can be a new cost variable $s_{ij}$ that represents the additional costs due to splits. There can be a cost difference variable $d_k$ which represents the cost difference of fulfilling single-line orders containing item k due to longer shipping distance. There can be a cost variable $h_k$ that represents the difference in holding costs for stocking item k outside the selection as opposed to within the selection. It can be seen that be setting the cost variables to different values, one can change the objective. For example, one set of cost variables can emphasize reducing shipping costs. Another set of cost variables can emphasize shortening of delivery speed.

There is a probability function δ that represents the probability of a split. Hence, the cost of an edge across the cut (the dividing line between the first warehouse and the second warehouse) is $\delta s_{ij}+(1-\delta)c_{ij}$.

The objective function can be rewritten to include these new variables as follows:

$\min_{x,y} \Sigma_{i,j}(\delta s_{ij}+(1-\delta)c_{ij})y_{ij}-\Sigma_{i,j}c_{ij}z_{ij}-E_k d_k x_k+\Sigma_k h_k x_k$ Such that, $y_{ij} \geq |x_i - x_j|$ $z_{ij} \leq x_i, z_{ij} \leq x_j$ $\Sigma_k s_k x_k \leq K$ $x_k=1, \forall k \in B$ $x_k=0, \forall k \in D$ $y_{ij} \geq 0, x_k, z_{ij} \in \{0,1\}$ The new objective function minimizes the total additional cost arising from an assortment selection as laid out previously. This formulation is general and includes special cases. An exemplary special case is when δ is zero. In this situation, there is no need to distinguish between cases 2 and 3.

Figure 10:
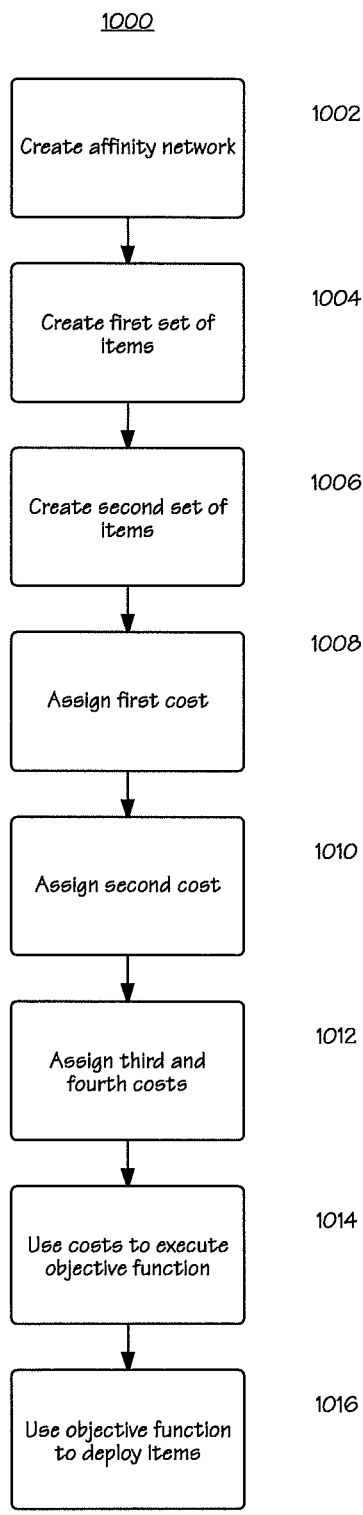
FIG. 10 is a flowchart illustrating the operation of an embodiment.

A flowchart illustrating the operation of a method 1000 of determining an optimal deployment of goods is presented in FIG. 10. Method 1000 is merely exemplary and is not limited to the embodiments presented herein. Method 1000 can be employed in many different embodiments or examples not specifically depicted or described herein. In some embodiments, the procedures, the processes and/or the activities of method 1000 can be performed in the order presented. In other embodiments, the procedures, the processes, and/or the activities of method 1000 can be performed in any other suitable order. In still other embodiments, one or more of the procedures, the processes, and/or the activities of method 1000 can be combined or skipped. In some embodiments, portions of method 1000 can be implemented by computer system 100 (FIG. 1).

For purposes of FIG. 10, we shall assume that the first location is the smaller location and the second location is the larger one. The goal of FIG. 10 is to determine the optimal deployment of goods into the first location. Either the first location or the second location may be a warehouse. Either the first location or the second location can be a DSV. It should be understood that the terms warehouse and location might be used interchangeably in this specification. An affinity network containing all items being sold by an eCommerce retailer is created (block 1002). A set B of items is created that contains items that should be placed in a first location (block 1004). A set D of items is created that contains items that cannot be placed in the first location (block 1006). The remaining items can be placed in either the first or second location, and the goal of method 1000 is to find the optimal deployment of items between the first location and the second location. In some embodiments, there can be more than two locations, but method 1000 will discuss the situation involving only two locations.

A cost is assigned to the differing shipping costs between the first location and the second location (block 1008). A cost is assigned for split shipments (block 1010). There also can be costs assigned for longer shipments and for holding costs (block 1012). Thereafter, an objective function is run in an attempt to minimize the various costs (block 1014). In some embodiment, the function being solved is as follows:

$\min_{x,y} \Sigma_{i,j}(\delta s_{ij}+(1-\delta)y_{ij}-\Sigma_{i,j}c_{ij}z_{ij}-\Sigma_k d_k x_k=\Sigma_k h_k x_k$ The result of the objective function is the optimum deployment of items in the most efficient manner. The items are deployed based on the instructions (block 1016).

Figure 11:
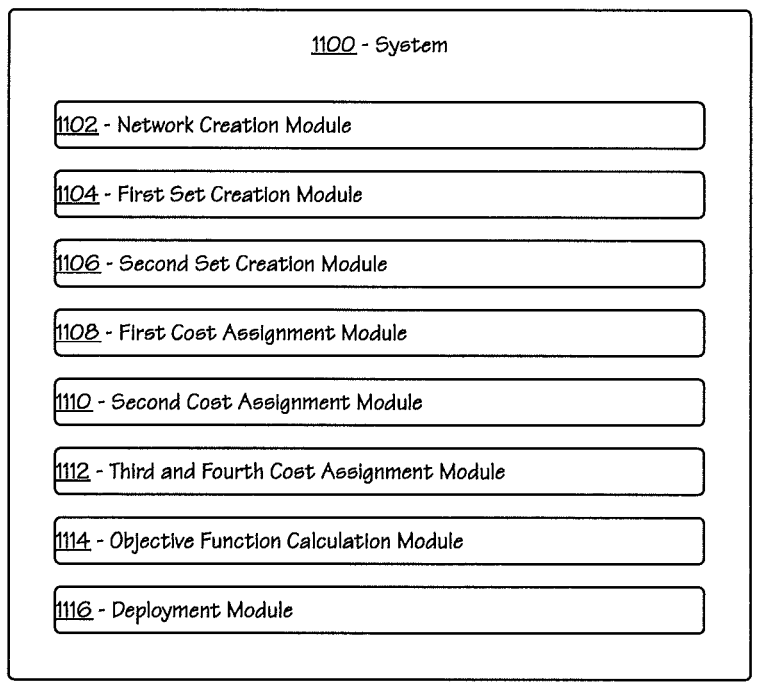
FIG. 11 is a block diagram of a system capable of performing an embodiment.

Turning ahead in the figures, FIG. 11 illustrates a block diagram of a system 1100 that is capable of performing disclosed embodiments. System 1100 is merely exemplary and is not limited to the embodiments presented herein.

System 1100 can be employed in many different embodiments or examples not specifically depicted or described herein. In some embodiments, certain elements or modules of system 1100 can perform various procedures, processes, and/or acts. In other embodiments, the procedures, processes, and/or acts can be performed by other suitable elements or modules.

In a number of embodiments, system 1100 can include network creation module 1102. In certain embodiments, network creation module 1102 can perform block 1002 (FIG. 10) of creating an affinity network.

In a number of embodiments, system 1100 can include first set creation module 1104. In certain embodiments, first set creation module 1104 can perform block 1004 (FIG. 10) of creating a first set B.

In a number of embodiments, system 1100 can include second set creation module 1106. In certain embodiments, second set creation module 1106 can perform block 1006 (FIG. 10) of creating a second set D.

In a number of embodiments, system 1100 can include first cost assignment module 1108. In certain embodiments, first cost assignment module 1108 can perform block 1008 (FIG. 10) of assigning a first cost representing differing shipping costs.

In a number of embodiments, system 1100 can include second cost assignment module 1110. In certain embodiments, first set creation module 1110 can perform block 1010 (FIG. 10) of assigning a second cost representing a cost for split shipments.

In a number of embodiments, system 1100 can include third and fourth cost assignment module 1112. In certain embodiments, third and fourth cost assignment module 1112 can perform block 1012 (FIG. 10) of assigning costs representing a cost for longer shipments and holding costs.

In a number of embodiments, system 1100 can include objective function calculation module 1114. In certain embodiments, third cost assignment module 1114 can perform block 1014 (FIG. 10) of calculating an objective function.

In a number of embodiments, system 1100 can include deployment module 1116. In certain embodiments, third cost assignment module 1116 can perform block 1016 (FIG. 10) of deploying items based on the calculation.

Although the above embodiments have been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 can be modified, and that the foregoing discussion of certain of these embodiments does not necessarily represent a complete description of all possible embodiments. For example, one or more of the procedures, processes, or activities of FIGS. 1-11 can include different procedures, processes, and/or activities and be performed by many different modules, in many different orders.

Replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
 a display;
 one or more input devices;
 one or more processing modules; and
 one or more non-transitory storage modules storing computing instructions configured to run on the one or more processing modules and perform acts of:
  receiving transaction data from a transaction database comprising a plurality of item IDs and a plurality of transaction IDs, wherein:
   each item ID of the plurality of item IDs corresponds to a respective item of a plurality of items being sold by an eCommerce provider; and
   each transaction ID of the plurality of transaction IDs corresponds with a respective transaction of a plurality of transactions;
  creating an affinity network using the transaction data received from the transaction database, the affinity network representing the plurality of items being sold by the eCommerce provider, the affinity network comprising:
   a plurality of nodes representing the plurality of items being sold by the eCommerce provider;
   a plurality of edges connecting the plurality of nodes, each of the plurality of edges connected to a different pair of the plurality of nodes, and the plurality of edges representing a sale of a pair of the plurality of items being sold by the eCommerce provider to one customer;
   a section boundary between a portion of the plurality of nodes, wherein:
    the section boundary crosses a portion of the plurality of edges, and divides the affinity network into a first section and a second section;
    the first section represents a first warehouse; and
    the second section represents a second warehouse different than the first warehouse;
  storing the affinity network in an association table comprising a plurality of first item IDs, a plurality of second item IDs, and a plurality of frequencies, wherein each frequency of the plurality of frequencies corresponds to a number of edges between a first node corresponding with a first item ID of the plurality of item IDs and a second node corresponding with a second item ID of the plurality of second item IDs;
  creating a first set of items being sold by the eCommerce provider from the plurality of nodes present in the first section using the association table, wherein the first set of items represents items of the plurality of items being sold by the eCommerce provider being initially stored at a first physical location comprising the first warehouse;
  creating a second set of items from the plurality of nodes in the second section using the association table, wherein the second set of items represents items of the plurality of items being sold by the eCommerce provider that are initially stored at a second physical location comprising the second warehouse and that cannot be moved to the first physical location;

assigning a first cost to an edge between an item i and an item j, the first cost comprising a cost difference between shipping the item i and the item j from the first physical location and shipping the item i and the item j from the second physical location, wherein the plurality of edges comprises the edge, and wherein the plurality of items being sold by the eCommerce provider comprises the item i and the item j;

determining one or more of the plurality of items being sold by the eCommerce provider to be deployed at the first physical location by using an objective function and the association table; and causing the one or more of the plurality of items to be stored at the first physical location.

2. The system of claim 1, wherein the computing instructions are further configured to run on the one or more processing modules and perform acts of:

assigning a second cost to a split shipment; and using the first cost and the second cost in the objective function to determine the one or more of the plurality of items being sold by the eCommerce provider to be deployed at the first physical location.

3. The system of claim 2, wherein:

using the objective function comprises determining a frequency of the plurality of items being sold by the eCommerce provider being contained in a single order; and the computing instructions are further configured to run on the one or more processing modules and perform an act of:

iterating through the plurality of items being sold by the eCommerce provider in the affinity network to determine a minimum of a product of the frequency and the first cost.

4. The system of claim 3, wherein the computing instructions are further configured to run on the one or more processing modules and perform an act of:

using the second cost to determine a maximum number of the plurality of items being sold by the eCommerce provider to be deployed in the first physical location.

5. The system of claim 4, wherein the computing instructions are further configured to run on the one or more processing modules and perform acts of:

determining, for every combination of two of the plurality of items being sold by the eCommerce provider in the affinity network, when there is a hard bundle containing a combination of the two of the plurality of items being sold by the eCommerce provider; and using the hard bundle in the objective function.

6. The system of claim 2, wherein the computing instructions are further configured to run on the one or more processing modules and perform acts of:

assigning a third cost for length of shipments;

assigning a fourth cost for holding costs; and using the third cost and the fourth cost in the objective function to determine the one or more of the plurality of items being sold by the eCommerce provider to be deployed at the first physical location.

7. The system of claim 6, wherein:

using the first cost, using the second cost, using the third cost, and using the fourth cost in the objective function comprises finding a minimum of the following expression:

$$\min_{x,y} \Sigma_{i,j}(\delta s_{ij}+(1-\delta)c_{ij})y_{ij}-\Sigma_{i,j}c_{ij}z_{ij}-E_k d_k x_k+\Sigma_k h_k x_k,$$

wherein $s_{ij}$ is the third cost, $\delta$ is an arbitrary small constant, $c_{ij}$ is the first cost, $z_{ij}$ is the second cost, $d_k$ is the third cost, $h_k$ is the fourth cost, and $x_k$ equals 1 for each item in the first set of items and equals zero for each item in the second set of items.

8. The system of claim 1, wherein the computing instructions are further configured to run on the one or more processing modules and perform an act of:

limiting a number of the plurality of items being sold by the eCommerce provider to be stored at the first physical location based on a capacity of the first physical location, wherein the first physical location is a smaller facility than the second physical location.

9. The system of claim 8, wherein:

the second physical location represents a drop shipment vendor (DSV).

10. The system of claim 1, wherein:

the computing instructions are further configured to run on the one or more processing modules and perform acts of:

assigning a second cost to a split shipment;

using the first cost and the second cost in the objective function to determine the one or more of the plurality of items being sold by the eCommerce provider to be deployed at the first physical location;

using the objective function comprises determining a frequency of the plurality of items being sold by the eCommerce provider being contained in a single order assigning a third cost for length of shipments;

assigning a fourth cost for holding costs;

using the third cost and the fourth cost in the objective function to determine the one or more of the plurality of items being sold by the eCommerce provider to be deployed at the first physical location;

limiting a number of the plurality of items being sold by the eCommerce provider to be stored at the first physical location based on a capacity of the first physical location; and iterating through the plurality of items being sold by the eCommerce provider in the affinity network to determine a minimum of a product of the frequency and the first cost;

using the first cost, using the second cost, using the third cost, and using the fourth cost in the objective function comprises finding a minimum of the following expression:

$$\min_{x,y} \Sigma_{i,j}(\delta s_{ij}+(1-\delta)c_{ij})y_{ij}-\Sigma_{i,j}c_{ij}z_{ij}-E_k d_k x_k+\Sigma_k h_k x_k;$$

$s_{ij}$ is the third cost, $\delta$ is an arbitrary small constant, $c_{ij}$ the first cost, $z_{ij}$ is the second cost, $d_k$ is the third cost, $h_k$ is the fourth cost, and $x_k$ equals 1 for each item in the first set of items and equals zero for each item in the second set of items; and the first physical location is a smaller facility than the second physical location.

11. The system of claim 1, wherein using the objective function comprises:

finding a minimum of the following expression:

$$\min_{x,y} \sum_{i,j} c_{ij} y_{ij}$$

such that:

$y_{ij} \geq |x_i - x_j|;$ $\Sigma_k x_k \leq K;$ $x_k = 1, \forall k \in B;$ $x_k = 0 \forall, k \in D;$ and $y_{ij} \geq 0, x_k \in \{0,1\};$ wherein $c_{ij}$ is the first cost, B represents the first set of items, D represents the second set of items, $y_{ij}$ is a binary variable representing whether or not the edge between the item i and the item j is within B, $x_k$ is a binary variable set to 1 when node k is within B and set to 0 when node k is within D, and K is a maximum number of items that can be added to the first physical location.

12. A method comprising:
receiving transaction data from a transaction database comprising a plurality of item IDs and a plurality of transaction IDs, wherein:
  each item ID of the plurality of item IDs corresponds to a respective item of a plurality of items being sold by an eCommerce provider; and
  each transaction ID of the plurality of transaction IDs corresponds with a respective transaction of a plurality of transactions;
creating an affinity network using the transaction data received from the transaction database, the affinity network representing the plurality of items being sold by the eCommerce provider, the affinity network comprising:
  a plurality of nodes representing the plurality of items being sold by the eCommerce provider;
  a plurality of edges connecting the plurality of nodes, each of the plurality of edges connected to a different pair of the plurality of nodes, and the plurality of edges representing a sale of a pair of the plurality of items being sold by the eCommerce provider to one customer;
  a section boundary between a portion of the plurality of nodes, wherein:
    the section boundary crosses a portion of the plurality of edges, and divides the affinity network into a first section and a second section;
    the first section represents a first warehouse; and
    the second section represents a second warehouse different than the first warehouse;
storing the affinity network in an association table comprising a plurality of first item IDs, a plurality of second item IDs, and a plurality of frequencies, wherein each frequency of the plurality of frequencies corresponds to a number of edges between a first node corresponding with a first item ID of the plurality of item IDs and a second node corresponding with a second item ID of the plurality of second item IDs;
creating a first set of items being sold by the eCommerce provider from the plurality of nodes present in the first section using the association table, wherein the first set of items represents items of the plurality of items being sold by the eCommerce provider being initially stored at a first physical location comprising the first warehouse;
creating a second set of items from the plurality of nodes in the second section using the association table, wherein the second set of items represents items of the plurality of items being sold by the eCommerce provider that are initially stored at a second physical location comprising the second warehouse and that cannot be moved to the first physical location;
assigning a first cost to an edge between an item i and an item j, the first cost comprising a cost difference between shipping the item i and the item j from the first physical location and shipping the item i and the item j from the second physical location, wherein the plurality of edges comprises the edge, and wherein the plurality of items being sold by the eCommerce provider comprises the item i and the item j;
determining one or more of the plurality of items being sold by the eCommerce provider to be deployed at the first physical location by using an objective function and the association table; and
causing the one or more of the plurality of items to be transferred from the second physical location to the first physical location.

13. The method of claim 12 further comprising:
assigning a second cost to a split shipment; and
using the first cost and the second cost in the objective function to determine the one or more of the plurality of items being sold by the eCommerce provider to be deployed at the first physical location.

14. The method of claim 13, wherein:
using the objective function comprises determining a frequency of the plurality of items being sold by the eCommerce provider being contained in a single order; and
the method further comprises:
  iterating through the plurality of items being sold by the eCommerce provider in the affinity network to determine a minimum of a product of the frequency and the first cost.

15. The method of claim 14 further comprising:
using the second cost to determine a maximum number of the plurality of items being sold by the eCommerce provider to be deployed in the first physical location.

16. The method of claim 15 further comprising:
determining, for every combination of two of the plurality of items being sold by the eCommerce provider in the affinity network, when there is a hard bundle containing a combination of the two of the plurality of items being sold by the eCommerce provider; and
using the hard bundle in the objective function.

17. The method of claim 13 further comprising:
assigning a third cost for length of shipments;
assigning a fourth cost for holding costs; and
using the third cost and the fourth cost in the objective function to determine the one or more of the plurality of items being sold by the eCommerce provider to be deployed at the first physical location.

18. The method of claim 17, wherein:
using the first cost, using the second cost, using the third cost, and using the fourth cost in the objective function comprises finding a minimum of the following expression:

$\min_{x,y} \Sigma_{i,j} (\delta s_{ij} + (1-\delta) c_{ij}) y_{ij} - \Sigma_{i,j} c_{ij} z_{ij} - E_k d_k x_k + \Sigma_k h_k x_k;$ $s_{ij}$ is the third cost, δ is an arbitrary small constant, $c_{ij}$ the first cost, $z_{ij}$ is the second cost, $d_k$ is the third cost, $h_k$ is the fourth cost, and $x_k$ equals 1 for each item in the first set of items and equals zero for each item in the second set of items.

19. The method of claim 12 further comprising:
limiting a number of the plurality of items being sold by the eCommerce provider to be stored at the first physical location based on a capacity of the first physical location, wherein the first physical location is a smaller facility than the second physical location.

20. The method of claim 12, wherein:
the second physical location represents a drop shipment vendor (DSV).

21. The method of claim 12, wherein the affinity network comprises:
a list of the plurality of items being sold by the eCommerce provider; and
orders fulfilled by the eCommerce provider.

22. The method of claim 21 further comprising:
creating the association table from the affinity network by determining, for each item in the affinity network, a list of items in a single order with the item of the plurality of items; and
using the association table to determine one or more items to be deployed at the first physical location by using the objective function.

23. The method of claim 12 further comprising:
assigning a second cost to a split shipment; and
using the first cost and the second cost in the objective function to determine the one or more of the plurality of items being sold by the eCommerce provider to be deployed at the first physical location;
using the second cost to determine a maximum number of the plurality of items being sold by the eCommerce provider to be deployed in the first physical location;
assigning a third cost for length of shipments;
assigning a fourth cost for holding costs;
using the third cost and the fourth cost in the objective function to determine the one or more of the plurality of items being sold by the eCommerce provider to be deployed at the first physical location;
limiting a number of the plurality of items being sold by the eCommerce provider to be stored at the first physical location based on a capacity of the first physical location; and
iterating through the plurality of items being sold by the eCommerce provider in the affinity network to determine a minimum of a product of the frequency and the first cost, wherein:
using the first cost, using the second cost, using the third cost, and using the fourth cost in the objective function comprises finding a minimum of the following expression:

$$\min\nolimits_{x,y} \Sigma_{i,j}(\delta s_{ij}+(1-\delta)c_{ij})y_{ij}-\Sigma_{i,j}c_{ij}z_{ij}-E_k d_k x_k+\Sigma_k h_k x_k;$$

$s_{ij}$ is the third cost, δ is an arbitrary small constant, $c_{ij}$ is the first cost, $z_{ij}$ is the second cost, $d_k$ is the third cost, $h_k$ is the fourth cost, and $x_k$ equals 1 for each item in the first set of items and equals zero for each item in the second set of items;
using the objective function comprises determining a frequency of the items being contained in a single order; and
the first physical location is a smaller facility than the second physical location.

24. The method of claim 12, wherein using the objective function comprises:
finding a minimum of the following expression:

$$\min_{x,y} \sum\nolimits_{i,j} c_{ij} y_{ij}$$

such that:

$y_{ij} \geq |x_i - x_j|;$ $\Sigma_k x_k \leq K;$ $x_k = 1, \forall k \in B;$ $x_k = 0, \forall k \in D;$ and $y_{ij} \geq 0, x_k \in \{0,1\};$ wherein $c_{ij}$ is the first cost, B represents the first set of items, D represents the second set of items, $y_{ij}$ is a binary variable representing whether or not the edge between the item i and the item j is within B, $x_k$ is a binary variable set to 1 when node k is within B and set to 0 when node k is within D, and K is a maximum number of items that can be added to the first physical location.

* * * * *